US012725612B2

(12) United States Patent
Yukimatsu

(10) Patent No.: US 12,725,612 B2
(45) Date of Patent: Sep. 1, 2026

(54) CONTROL DEVICE AND CONTROL METHOD

(71) Applicant: TOYOTA JIDOSHA KABUSHIKI KAISHA, Toyota (JP)

(72) Inventor: Toru Yukimatsu, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 144 days.

(21) Appl. No.: 18/649,494

(22) Filed: Apr. 29, 2024

(65) Prior Publication Data

US 2025/0014575 A1 Jan. 9, 2025

(30) Foreign Application Priority Data

Jul. 6, 2023 (JP) ................................ 2023-111688

(51) Int. Cl.
*G10L 15/22* (2006.01)
*H04M 3/56* (2006.01)

(52) U.S. Cl.
CPC ............ *G10L 15/22* (2013.01); *H04M 3/568* (2013.01)

(58) Field of Classification Search
CPC ... H04M 1/6075; H04M 1/6083; G06F 3/167; G10L 15/22
See application file for complete search history.

(56) References Cited

U.S. PATENT DOCUMENTS 8,818,459 B2 * 8/2014 Okayasu ............ H04M 1/6091 455/563
10,291,996 B1 * 5/2019 Shaffer ................. B60N 2/002
10,999,419 B1 * 5/2021 Willis .................... G06F 16/68
2004/0082368 A1 * 4/2004 Yoon .................. H04M 1/6075 455/566
2005/0221852 A1 * 10/2005 D'Avello ............. H04W 88/02 455/518
2016/0039356 A1 * 2/2016 Talwar .................... H04R 3/00 381/86
2020/0202862 A1 * 6/2020 Lee ..................... H04M 1/6091
2021/0142802 A1 * 5/2021 Furuyama ............. H04R 3/005
2023/0016538 A1 * 1/2023 Gaß ........................ H04W 4/40
2025/0201243 A1 * 6/2025 Yae ........................ G10L 15/22

FOREIGN PATENT DOCUMENTS

DE 112017007280 T5 * 11/2019 ............ G10L 17/04
JP 2007104343 A * 4/2007
JP 2009-297892 A 12/2009
JP 2021-34781 A 3/2021

* cited by examiner

*Primary Examiner* — Daniel Abebe
(74) *Attorney, Agent, or Firm* — Sughrue Mion, PLLC

(57) ABSTRACT

The control device includes a control unit. The control unit recognizes a voice command transmitted from a telephone terminal outside the vehicle. The control unit interprets the operation content requested by the recognized voice command. The control unit selects one or more positions at which the sound is picked up by the microphone in the vehicle cabin based on the interpreted operation content. The control unit picks up a voice uttered at one or more selected positions by a microphone and transmits the picked up voice to a telephone terminal.

11 Claims, 3 Drawing Sheets

TELEPHONE TERMINAL
40
40B (40)
40A (40)
1
2
10
VEHICLE
COMMUNICATION UNIT
11
POSITIONING UNIT
12
INPUT UNIT
13
OUTPUT UNIT
14
STORAGE UNIT
15
CONTROL UNIT
16
20
CONTROL DEVICE
COMMUNICATION UNIT
21
STORAGE UNIT
22
CONTROL UNIT
23
AUDIO MIX SECTION
24
30
FIRST MOBILE TERMINAL
COMMUNICATION UNIT
31
POSITIONING UNIT
32
INPUT UNIT
33
OUTPUT UNIT
34
STORAGE UNIT
35
CONTROL UNIT
36

FIG. 3

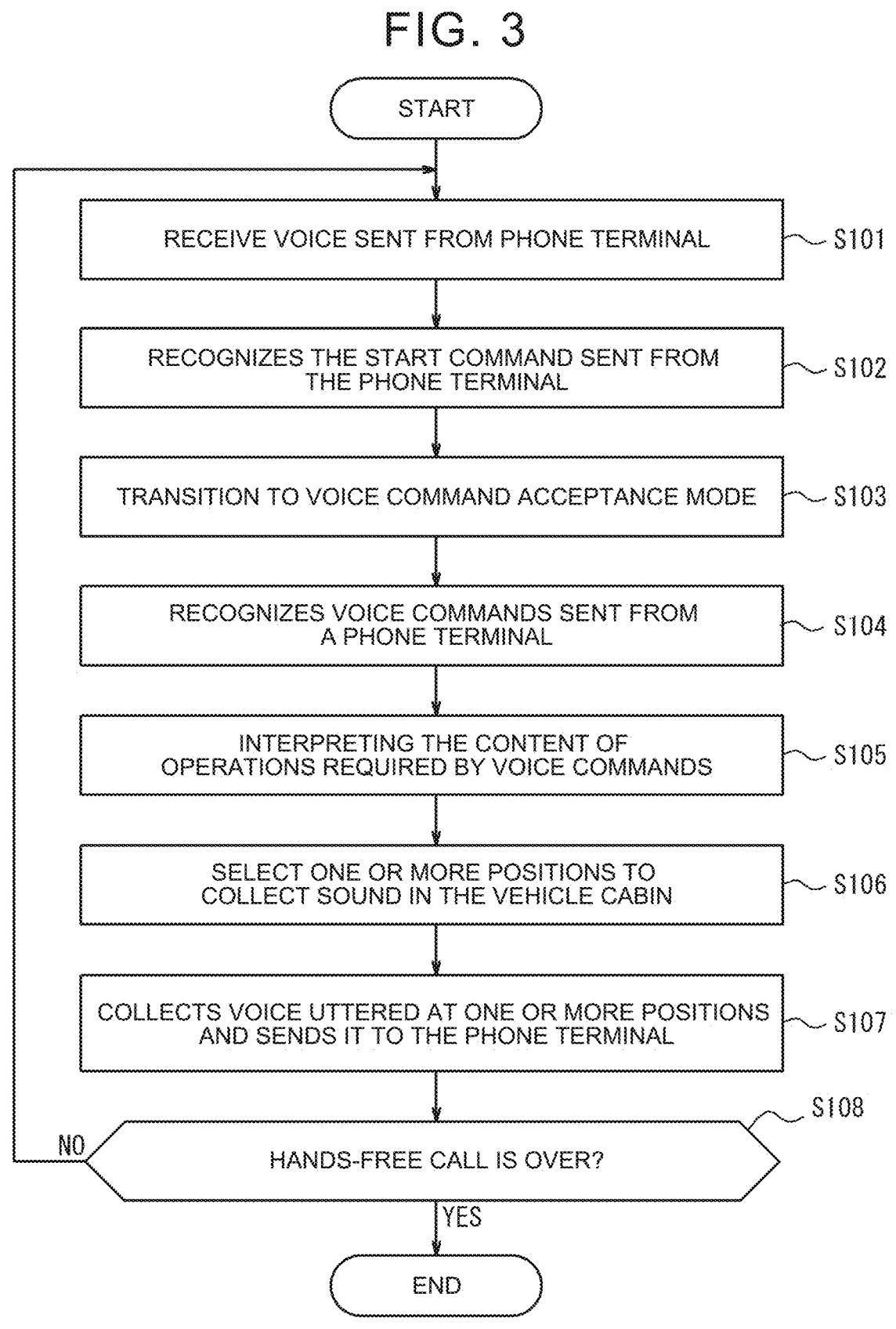

START

S101 RECEIVE VOICE SENT FROM PHONE TERMINAL

S102 RECOGNIZES THE START COMMAND SENT FROM THE PHONE TERMINAL

S103 TRANSITION TO VOICE COMMAND ACCEPTANCE MODE

S104 RECOGNIZES VOICE COMMANDS SENT FROM A PHONE TERMINAL

S105 INTERPRETING THE CONTENT OF OPERATIONS REQUIRED BY VOICE COMMANDS

S106 SELECT ONE OR MORE POSITIONS TO COLLECT SOUND IN THE VEHICLE CABIN

S107 COLLECTS VOICE UTTERED AT ONE OR MORE POSITIONS AND SENDS IT TO THE PHONE TERMINAL

S108 HANDS-FREE CALL IS OVER?

NO

YES

END

CONTROL DEVICE AND CONTROL METHOD

CROSS-REFERENCE TO RELATED APPLICATION

This application claims priority to Japanese Patent Application No. 2023-111688 filed on Jul. 6, 2023, incorporated herein by reference in its entirety.

BACKGROUND

1. Technical Field

The present disclosure relates to a control device and a control method.

2. Description of Related Art

Hitherto, there has been known a technology for controlling voice output to an occupant of a vehicle during a hands-free call. For example, Japanese Unexamined Patent Application Publication No. 2021-34781 (JP 2021-34781 A) discloses a technology for selectively switching voice output to an occupant based on an attribute of a speaker outside a vehicle and an attribute of the occupant.

Since the speaker outside the vehicle cannot control the voice output inside the vehicle, the speaker has no operation means even if there is dissatisfaction with the voice inside the vehicle. Therefore, there is room for improvement in the technology for controlling voice output to an occupant of a vehicle during a hands-free call.

SUMMARY

In view of such circumstances, an object of the present disclosure is to improve a technology for controlling voice output to an occupant of a vehicle during a hands-free call.

A control device according to an embodiment of the present disclosure is a control device to be mounted on a vehicle. The control device includes a control unit configured to:

- recognize a voice command transmitted from a telephone terminal outside the vehicle;
- interpret operation details requested by the recognized voice command;
- select one or more positions to collect voice with a microphone in a vehicle cabin based on the interpreted operation details; and
- collect, with the microphone, voice uttered at the one or more selected positions and transmit the voice to the telephone terminal.

A control method according to an embodiment of the present disclosure is a control method to be executed by a control device mounted on a vehicle. The control method includes:

- recognizing a voice command transmitted from a telephone terminal outside the vehicle;
- interpreting operation details requested by the recognized voice command;
- selecting one or more positions to collect voice with a microphone in a vehicle cabin based on the interpreted operation details; and
- collecting, with the microphone, voice uttered at the one or more selected positions and transmitting the voice to the telephone terminal.

According to the embodiments of the present disclosure, the technology for controlling the voice output to the occupant of the vehicle during the hands-free call is improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart illustrating an operation of the control device.

DETAILED DESCRIPTION OF EMBODIMENTS

Figure 1:
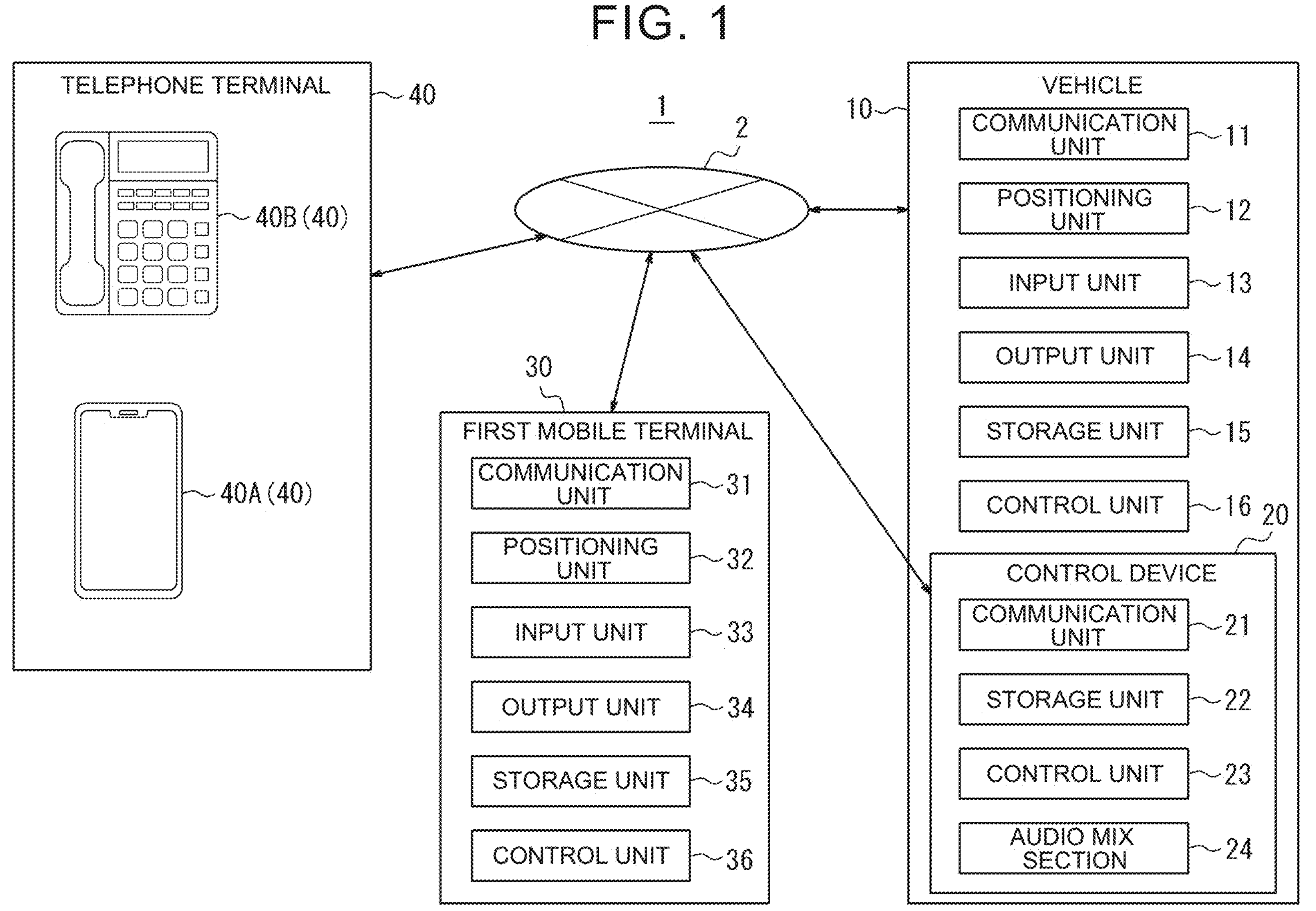
FIG. 1 is a block diagram illustrating a schematic configuration example of a system according to an embodiment of the present disclosure.

Hereinafter, an embodiment of the present disclosure will be described.

Outline of Embodiment

The outline of a system 1 according to an embodiment of the present disclosure will be described with reference to FIG. 1. The system 1 includes a vehicle 10, a control device 20, a first mobile terminal 30, and a telephone terminal 40. The telephone terminal 40 is a second mobile terminal 40A or a fixed telephone 40B. The vehicle 10, the control device 20, the first mobile terminal 30, and the telephone terminal 40 are communicably connected to a network 2 including, for example, the Internet and a mobile communication network.

The vehicle 10 is, for example, an automobile, but is not limited to this, and may be any vehicle. Vehicles include, but are not limited to, gasoline-powered vehicles, Battery Electric Vehicle (BEV), Hybrid Electric Vehicle (HEV), Plug-in Hybrid Electric Vehicle (PHEV), or Fuel Cell Electric Vehicle (FCEV). The number of vehicles 10 included in the system 1 may be arbitrarily determined.

The control device 20 is a computer provided in the vehicle 10. The control device 20 is communicably connected to the vehicle 10 and the first mobile terminal 30 via the network 2. The control device 20 may be connected to the vehicle 10 by wire.

The first mobile terminal 30 is a smartphone or a mobile phone carried by an occupant of the vehicle. The first mobile terminal 30 is communicably connected to the vehicle 10, the control device 20, and the telephone terminal 40 via the network 2.

The telephone terminal 40 is a second mobile terminal 40A carried by a speaker outside the vehicle or a fixed telephone 40B used for a speech call. The second mobile terminal 40A is a smart phone or a mobile phone. The telephone terminal 40 is communicably connected to the first mobile terminal 30 via the network 2.

First, an outline of the present embodiment will be described. Details will be described later. The control device 20 is a control device mounted on the vehicle 10. The control device 20 recognizes a voice command transmitted from the telephone terminal 40 outside the vehicle. The control device 20 interprets the operation content requested by the recognized voice command. The control device 20 selects one or more positions at which the sound is picked up by the microphone 13 in the vehicle cabin based on the interpreted operation content. The control device 20 picks up the voice uttered at the selected one or more positions by the microphone 13 and transmits the picked up voice to the telephone terminal 40.

As described above, according to the present embodiment, the control device 20 recognizes the voice command transmitted from the telephone terminal 40 used by the speaker outside the vehicle, and selects one or more positions at which the voice is picked up by the microphone 13 in the vehicle cabin. Therefore, even in a situation in which the driver of the vehicle 10 is unable to perform an operation, the control device 20 can select a position for inputting a voice in the vehicle cabin in response to a request from a speaker outside the vehicle. Therefore, the probability that the speaker 4 outside the vehicle can listen to the voice from the occupant 3 who desires to make a call in the vehicle is improved. In this regard, the technique of controlling the audio output of the occupant 3 of the vehicle 10 during a hands-free call is improved.

Next, each configuration of the system 1 will be described in detail.

Configuration of Vehicle

As illustrated in FIG. 1, the vehicle 10 includes a communication unit 11, a positioning unit 12, an input unit 13, an output unit 14, a storage unit 15, a control unit 16, and a control device 20. Details of the control device 20 will be described later.

The communication unit 11 includes one or more communication interfaces connected to the network 2. The communication interfaces correspond to mobile communication standards such as 4th Generation (4G) or 5th Generation (5G), for example, but are not limited thereto. In the present embodiment, the vehicle 10 communicates with the control device 20 via the communication unit 11 and the network 2. The vehicle 10 may be communicably connected to the control device 20 by a wire.

The positioning unit 12 includes one or more devices that acquire position information of the vehicle 10. Specifically, the positioning unit 12 includes, for example, a receiver corresponding to GPS. The positioning unit 12 is not limited to this. The positioning unit 12 may include a receiver corresponding to any satellite positioning system.

The input unit 13 includes at least one input interface capable of accepting an input by a driver of the vehicle 10. The input interface is, for example, a physical key, a capacitive key, a pointing device, a camera, a touch screen integrally provided with a display of an output unit 14 to be described later, or a microphone (hereinafter, also referred to as a microphone 13) that picks up the voice of the driver. However, the input interface is not limited thereto.

The output unit 14 includes at least one audio output interface capable of outputting audio and at least one display interface capable of displaying text or video. The audio output interface is, for example, a speaker (hereinafter, also referred to as a speaker 14). The display interfaces are, for example, displays such as LCD or organic EL displays. The audio output interface and the display interface are not limited thereto.

The storage unit 15 includes one or more memories. The memory is, for example, a semiconductor memory, a magnetic memory, an optical memory, or the like. The memory is not limited thereto. Each memory included in the storage unit 15 may function as, for example, a main storage device, an auxiliary storage device, or a cache memory. The storage unit 15 stores any type of information that is used for the operation of the vehicle 10. For example, the storage unit 15 may store a system program, an application program, embedded software, and the like. The information stored in the storage unit 15 may be updatable by, for example, information acquired from the network 2 via the communication unit 11.

The control unit 16 includes one or more processors, one or more programmable circuits, one or more dedicated circuits, or a combination of these. The processor may be a general-purpose processor such as, for example, Central Processing Unit (CPU) or Graphics Processing Unit (GPU), or a special-purpose processor specialized for a particular process. The processor is not limited thereto. The programmable circuitry is, for example, but not limited to, Field-Programmable Gate Array (FPGA). The dedicated circuitry is, for example, but not limited to, Application Specific Integrated Circuit (ASIC). The control unit 16 controls the operation of the entire vehicle 10.

Configuration of the Control Device

As illustrated in FIG. 1, the control device 20 includes a communication unit 21, a storage unit 22, a control unit 23, and a voice mixing unit (audio MIX unit) 24.

The communication unit 21 includes one or more communication interfaces connected to the network 2. The communication interfaces correspond to, for example, a mobile communication standard, a wired Local Area Network (LAN) standard, or a radio LAN standard. The communication interface is not limited thereto. The communication interface may correspond to any communication standard. In the present embodiment, the control device 20 communicates with the vehicle 10 and the first mobile terminal 30 via the communication unit 21 and the network 2.

The storage unit 22 includes one or more memories. Each memory included in the storage unit 22 may function as, for example, a main storage device, an auxiliary storage device, or a cache memory. The storage unit 22 stores any information used for the operation of the control device 20. For example, the storage unit 22 may store a system program, an application program, a database, and the like. The information stored in the storage unit 22 may be updatable by, for example, information acquired from the network 2 via the communication unit 21.

The control unit 23 includes one or more processors, one or more programmable circuits, one or more dedicated circuits, or a combination thereof. The control unit 23 controls the operation of the entire control device 20.

Figure 2:
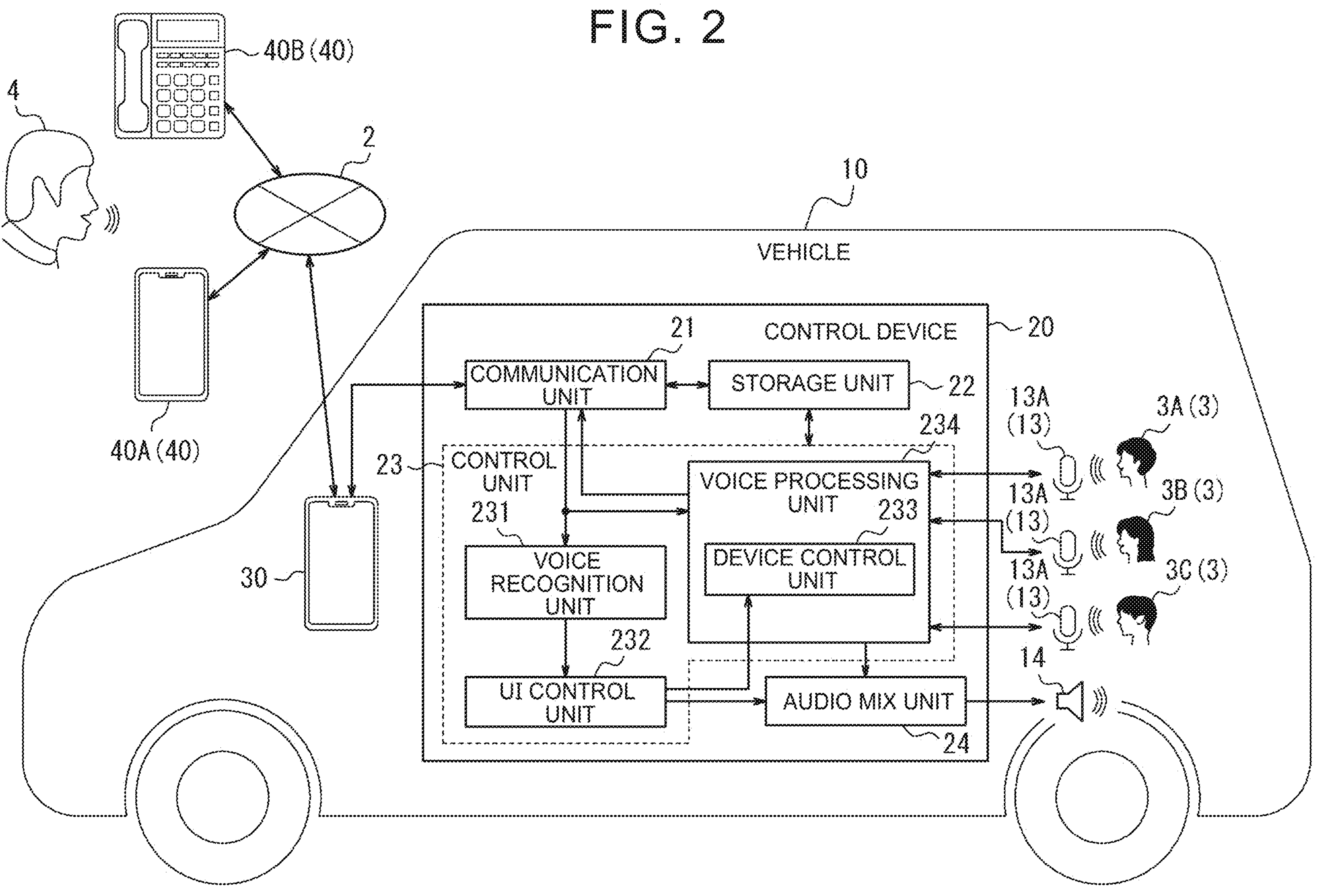
FIG. 2 is a block-diagram illustrating an exemplary schematic configuration of a control device.

As illustrated in FIG. 2, in the present embodiment, the control unit 23 functions as a voice recognition unit 231, a user interface control unit (UI control unit) 232, a device control unit 233, and a voice processing unit 234.

The voice recognition unit 231 recognizes a voice command transmitted from the telephone terminal 40 outside the vehicle.

The user interface control unit 232 interprets the operation content requested by the recognized voice command.

The device control unit 233 selects one or more positions at which sound is picked up by the microphone 13 in the vehicle cabin based on the interpreted operation content.

The voice processing unit 234 inputs the voice transmitted from the telephone terminal 40 outside the vehicle via the communication unit 21. Further, the voice processing unit 234 picks up the voice uttered at one or more selected positions by the microphone 13 in the vehicle cabin, and transmits the picked up voice to the telephone terminal 40 outside the vehicle.

The voice mixing unit 24 overlaps the voice received from the voice processing unit 234 and transmitted from the telephone terminal 40 outside the vehicle with the voice generated in accordance with the operation content interpreted by the user interface control unit 232. The voice mixing unit 24 outputs the sound to the speaker 14 in the vehicle cabin.

Configuration of the First Mobile Terminal

As illustrated in FIG. 1, the first mobile terminal 30 includes a communication unit 31, a positioning unit 32, an input unit 33, an output unit 34, a storage unit 35, and a control unit 36.

The communication unit 31 includes at least one communication module connectable to the network 2. The communication module is, for example, a communication module corresponding to the mobile communication standard such as LTE, 4G or 5G. However, the communication module is not limited to the above. The communication module may be compatible with any communication standard.

The positioning unit 32 can acquire the position information of the first mobile terminal 30. The positioning unit 32 includes at least one receiving module corresponding to the satellite positioning system. The receiving module is, for example, a receiving module corresponding to GPS. However, the receiving module is not limited thereto. The receiving module may be a receiving module corresponding to any satellite positioning system.

The input unit 33 includes at least one input interface capable of accepting an input by the driver. The input interface is, for example, a physical key, a capacitive key, a pointing device, a touch screen integrally provided with a display, a microphone, or the like. However, the input interface is not limited to this.

The output unit 34 is capable of outputting data. The output unit 34 includes at least one output interface capable of outputting data. The output interface is, for example, a display or a speaker. The display may be, for example, an LCD or an organic EL display. However, the output interface is not limited to this.

The storage unit 35 includes one or more memories. The memories are, for example, a semiconductor memory, a magnetic memory, or an optical memory, but are not limited to these memories. Each memory included in the storage unit 35 may function as, for example, a main storage device, an auxiliary storage device, or a cache memory. The storage unit 35 stores arbitrary information used for the operation of the first mobile terminal 30. For example, the storage unit 35 may store a system program, an application program, embedded software, and the like. The information stored in the storage unit 35 may be updatable by, for example, information acquired from the network 2 via the communication unit 31.

The control unit 36 includes at least one processor, at least one dedicated circuit, or a combination thereof. The control unit 36 executes processing related to the operation of the first mobile terminal 30 while controlling each unit of the first mobile terminal 30.

Configuration of the Phone Terminal

The telephone terminal 40 is a fixed telephone 40B used for a second mobile terminal 40A or a speech call carried by a speaker outside the vehicle. The second mobile terminal 40A is a smart phone or a mobile phone. The second mobile terminal 40A has the same configuration as the first mobile terminal 30.

Operation Flow of the Control Device

The operation of the control device 20 according to the present embodiment will be described with reference to FIG. 3. This operation relates to the control of the audio output of the occupant 3 of the vehicle 10 during a hands-free call.

S101: The control unit 23 receives the sound transmitted from the telephone terminal 40 via the first mobile terminal 30 and the communication unit 21.

The communication unit 21 is communicably connected to the first mobile terminal 30 by, for example, Bluetooth (registered trademark). The communication method is not limited to Bluetooth. The control device 20 cooperates with the first mobile terminal 30 by pairing both devices. Hands-free communication with the telephone terminal 40 outside the vehicle is enabled.

The control unit 23 inputs the voice transmitted from the telephone terminal 40 to the voice processing unit 234 via the first mobile terminal 30 and the communication unit 21. The voice processing unit 234 outputs the input audio to the voice mixing unit 24. The voice mixing unit 24 outputs the output sound to the speaker 14 of the vehicle 10. The speaker 14 is a speaker of car audio arranged in the vehicle cabin.

When the occupant 3 of the vehicle 10 who has heard the sound output from the speaker 14 makes an utterance, the input unit 13 (microphone 13) of the vehicle 10 collects the utterance and outputs the utterance to the voice processing unit 234. The voice processing unit 234 transmits the collected voice of the utterance to the telephone terminal 40 via the communication unit 21 and the first mobile terminal 30.

The occupants 3 of the vehicles 10 are the driver (driver's seat occupant) 3A, the occupant 3B of the passenger seat, and the occupant 3C of the rear seat. The occupant 3B of the passenger seat and the occupant 3C of the rear seat may not be in the vehicle 10.

With respect to the microphone 13, a microphone 13A is installed at the position of the driver's seat of the vehicle 10, a microphone 13B is installed at the position of the passenger's seat, and a microphone 13C is installed at the position of the rear seat. The microphone 13A is installed at a position where a sound uttered by the driver 3A can be picked up at a predetermined threshold or more. It should be noted that the microphone 13A installed at such a position does not need to be able to collect the sound uttered by the occupant 3B of the passenger seat and the occupant 3C of the rear seat at a level higher than or equal to the predetermined threshold. Similarly, the microphone 13B and the microphone 13C are installed at positions at which the sound uttered by the occupant 3B of the passenger seat and the occupant 3C of the rear seat can be picked up at the predetermined thresholds or more.

S102: The control unit 23 recognizes an activation command included in the speech transmitted from the telephone terminal 40.

S103: The control unit 23 transitions to the voice-command acceptance mode.

The start command is, for example, "Hay, Toyota! The utterance is". The utterance content is not limited to this. Upon recognizing the start command included in the voice, the control unit 23 transitions to the acceptance mode of the voice command. The control unit 23 switches the input destination of the voice so as to input the voice transmitted from the telephone terminal 40 to the voice recognition unit 231 in addition to the voice processing unit 234.

S104: The voice recognition unit 231 of the control unit 23 recognizes the voice command transmitted from the telephone terminal 40 outside the vehicle.

The voice command includes, for example, (i) "turn off the voice of someone other than the driver!", (ii) "collect the voice of the passenger seat!", and (iii) "pick up all the voices of the driver, the passenger seat, and the rear seat!". Voice commands are not limited to these. When the voice recognition unit 231 recognizes the voice command in the voice transmitted from the telephone terminal 40 outside the vehicle, it outputs the recognized voice command to the user interface control unit 232.

S105: The user interface control unit 232 of the control unit 23 interprets the manipulation content requested by the recognized speech command.

The user interface control unit 232 interprets, for example, from the above-described voice commands (i), (ii), and (iii), that the content of each operation is "not to collect sound at positions other than the driver's seat", "to collect sound at positions of the driver's seat and the passenger's seat", and "to collect sound widely at all positions in the vehicle cabin".

Here, the user interface control unit 232 may generate a voice corresponding to the interpreted operation content. In the case of (i) described above, for example, a sound "sound other than the driver's seat is not picked up" is generated. The user interface control unit 232 outputs the generated sound to the voice mixing unit 24.

The voice mixing unit 24 superimposes the voice transmitted from the telephone terminal 40 (the voice acquired from the voice processing unit 234) and the voice generated according to the operation content, and outputs the voice to the speaker 14 in the vehicle cabin. The voice mixing unit 24 may temporarily adjust the generated voice to a large volume and the voice of the other party to a small volume when the voice is superimposed. A pre-confirmation or a pre-notification of the sound collection change may be made to the occupant 3 of the vehicle 10 by the output of the sound generated according to the operation content.

The user interface control unit 232 may output the interpreted operation content to the device control unit 233 after the sound generated by the voice mixing unit 24 is output to the speaker 14 in order to perform the pre-confirmation or the pre-notification of the sound pickup change to the occupant 3. On the other hand, when the pre-confirmation or the pre-notification is not performed, the user interface control unit 232 may output the operation content to the device control unit 233 and output the sound generated according to the operation content to the voice mixing unit 24 at the same time.

S106: The device control unit 233 of the control unit 23 selects one or more positions at which the sound is picked up by the microphone 13 in the vehicle cabin based on the interpreted manipulation content.

The one or more positions are, for example, positions of one or more of the driver's seat, the passenger seat, and the rear seat of the vehicle 10. One or more positions are not limited thereto. The device control unit 233 selects a position to be picked up by the microphone 13 in the vehicle cabin based on the interpreted operation content. When the manipulation content is "not to collect sounds other than the driver's seat", the device control unit 233 turns ON the microphone 13A at the driver's seat position and turns OFF the microphone 13B and 13C at the positions of the passenger's seat and the rear seat. In addition, when the manipulation content is "to collect sound widely at all positions in the vehicle cabin", the device control unit 233 turns ON all of the microphone 13A, the microphone 13B, and 13C in the positions of the driver's seat, the passenger's seat, and the rear seat.

S107: The voice processing unit 234 of the control unit 23 picks up the voice uttered at one or more selected positions by the microphone 13 and transmits the picked up voice to the telephone terminal 40.

The voice processing unit 234 acquires the sound picked up by the microphone 13, and transmits the sound to the telephone terminal 40 via the communication unit 21 and the first mobile terminal 30. When the device control unit 233 selects (switches) the position of the microphone 13 that performs sound collection in the vehicle cabin, the way in which the sound transmitted to the speaker 4 outside the vehicle is heard changes. For example, the voice of the driver 3A can be easily heard by the speaker 4 outside the vehicle, or the occupant 3B of the passenger seat or the voice of the occupant 3C of the rear seat can be easily heard by the speaker 4 outside the vehicle.

S108: The control unit 23 returns to S101 when the hands-free call continues, and ends the operation flow when the hands-free call ends.

As described above, the control device 20 according to the present embodiment recognizes the voice command transmitted from the telephone terminal 40 outside the vehicle. The control device 20 interprets the operation content requested by the recognized voice command. The control device 20 selects one or more positions at which the sound is picked up by the microphone 13 in the vehicle cabin based on the interpreted operation content. The control device 20 picks up the voice uttered at the selected one or more positions by the microphone 13 and transmits the picked up voice to the telephone terminal 40.

According to this configuration, the control device 20 recognizes a voice command transmitted from the telephone terminal 40 used by the speaker 4 outside the vehicle. The control device 20 selects one or more positions at which sound is picked up by the microphone 13 in the vehicle cabin. Therefore, even when the driver 3A of the vehicle 10 is unable to operate, the control device 20 can select a position for inputting the sound in the vehicle cabin in response to a request from the speaker 4 outside the vehicle. Therefore, the probability that the speaker 4 outside the vehicle can listen to the voice from the occupant 3 who desires to make a call in the vehicle is improved. In this regard, the technique of controlling the audio output of the occupant 3 of the vehicle 10 during a hands-free call is improved.

While the disclosure has been described with reference to the drawings and examples, various changes and modifications may be made in accordance with the disclosure. Accordingly, these variations and modifications are within the scope of the present disclosure. For example, the functions and the like included in each component or each step can be rearranged so as not to logically contradict each other. It is possible to combine or divide a plurality of components or steps or the like into one.

For example, in the above-described embodiment, the configuration and operation of the control device 20 may be distributed among a plurality of computers capable of communicating with each other. Further, for example, an embodiment in which some or all of the components of the control device 20 are provided in the vehicle 10 is also possible. For example, the control unit 16 of the vehicle 10 may include some or all of the components of the control device 20.

In the above-described embodiment, an example has been described in which the device control unit 233 of the control device 20 selects the position of the sound pickup microphone based on the voice command transmitted by the speaker 4 outside the vehicle. The operation target of the device control unit 233 is not limited to the sound collection processing. The device control unit 233 may operate the switches of the instrument panel, for example, setting the destination of the car navigation system. The control device 20 performs an operation troublesome to the driver 3A who is driving the vehicle 10 in place of the driver 3A in response to a request from the speaker 4 outside the vehicle.

Further, for example, an embodiment in which a general-purpose computer functions as the control device 20 according to the above-described embodiment is also possible. Specifically, a program describing the contents of processing for realizing each function of the control device 20 according to the above-described embodiment is stored in a memory of a general-purpose computer. The processor reads and executes the program. Therefore, the present disclosure can also be realized as a program that can be executed by the processor or a non-transitory computer-readable medium that stores the program.

What is claimed is:

1. A control device to be mounted on a vehicle, the control device comprising a control unit configured to:

recognize a voice command from a voice transmitted from a telephone terminal outside the vehicle;

interpret operation details requested by the recognized voice command;

select one or more positions to collect voice inside the vehicle with a microphone in a vehicle cabin of the vehicle based on the interpreted operation details; and collect, with the microphone, voice uttered at the one or more selected positions and transmit the collected voice to the telephone terminal.

2. The control device according to claim 1, wherein the one or more positions are positions of one or more seats out of a driver's seat, a passenger's seat, and a rear seat of the vehicle.

3. The control device according to claim 2, wherein the operation details include:

not collecting voice other than voice at the driver's seat;

collecting voice at the driver's seat and voice at the passenger's seat; and collecting all of voice at the driver's seat, voice at the passenger's seat, and voice at the rear seat.

4. The control device according to claim 1, further comprising a voice mixing unit configured to superimpose voice transmitted from the telephone terminal and voice generated based on the operation details and output the superimposed voice to a loudspeaker in the vehicle cabin.

5. The control device according to claim 1, wherein the voice transmitted from the telephone terminal outside the vehicle comprises an activation command, and wherein the recognizing of the voice command is triggered in response to the recognition of the activation command.

6. The control device according to claim 1, wherein the operation details are interpreted as a sound collection change, and wherein the voice notification notifies an occupant in the vehicle about the sound collection change.

7. The control device according to claim 1, wherein the voice notification requests a pre-confirmation on the interpreted operation details from an occupant in the vehicle.

8. The control device according to claim 1, wherein the control unit is further configured to:

generate a voice notification of the interpreted operation details, the voice notification notifying an occupant of the vehicle on the interpreted operation details;

superimpose the voice transmitted from the telephone terminal outside the vehicle and the generated voice notification to generate a superimposed voice; and output the superimposed voice to a speaker in the vehicle cabin of the vehicle.

9. The control device according to claim 8, wherein, in the superimposed voice, the voice notification is output at a first volume and the voice transmitted from the telephone terminal outside the vehicle is output at a second volume that is lower than the first volume.

10. A control method to be executed by a control device mounted on a vehicle, the control method comprising:

recognizing a voice command from a voice transmitted from a telephone terminal outside the vehicle;

interpreting operation details requested by the recognized voice command;

selecting one or more positions to collect voice inside the vehicle with a microphone in a vehicle cabin of the vehicle based on the interpreted operation details; and collecting, with the microphone, voice uttered at the one or more selected positions and transmitting the collected voice to the telephone terminal.

11. The control method according to claim 10, further comprising:

generating a voice notification of the interpreted operation details, the voice notification notifying an occupant of the vehicle on the interpreted operation details;

superimposing the voice transmitted from the telephone terminal outside the vehicle and the generated voice notification to generate a superimposed voice; and output the superimposed voice to a speaker in the vehicle cabin of the vehicle.

* * * * *